United States Patent
Risse et al.

(10) Patent No.: US 10,717,423 B2
(45) Date of Patent: Jul. 21, 2020

(54) METHOD FOR CONTROLLING BRAKES IN A TRAILER VEHICLE

(71) Applicant: WABCO GmbH, Hannover (DE)

(72) Inventors: Rainer Risse, Pattensen-Reden (DE); Armin Sieker, Bielefeld (DE); Axel Stender, Hameln (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 15/580,807

(22) PCT Filed: Jun. 4, 2016

(86) PCT No.: PCT/EP2016/000920
§ 371 (c)(1),
(2) Date: Dec. 8, 2017

(87) PCT Pub. No.: WO2016/198152
PCT Pub. Date: Dec. 15, 2016

(65) Prior Publication Data
US 2018/0222463 A1  Aug. 9, 2018

(30) Foreign Application Priority Data
Jun. 10, 2015  (DE) .......... 10 2015 007 384

(51) Int. Cl.
*B60T 8/32* (2006.01)
*B60T 17/18* (2006.01)
(Continued)

(52) U.S. Cl.
CPC ............ *B60T 8/327* (2013.01); *B60T 8/1708* (2013.01); *B60T 8/323* (2013.01); *B60T 13/38* (2013.01);
(Continued)

(58) Field of Classification Search
CPC ........ B60T 8/327; B60T 8/323; B60T 8/1708; B60T 17/18; B60T 13/683; B60T 13/385;
(Continued)

(56) References Cited

U.S. PATENT DOCUMENTS 7,784,879 B2 * 8/2010 Koelzer ............. B60G 17/0523
303/20
7,971,942 B2 * 7/2011 Parrott ...................... B60T 7/20
303/118.1
(Continued)

FOREIGN PATENT DOCUMENTS

DE         3544356 A1    6/1987
DE        19942533 A1   11/2000
(Continued)

OTHER PUBLICATIONS

PCT/EP2016/000920 International Search Report dated Sep. 23, 2016, 3 pages.
(Continued)

*Primary Examiner* — Xuan Lan Nguyen
(74) *Attorney, Agent, or Firm* — Warner Norcross + Judd LLP

(57) ABSTRACT

Disclosed is a method for controlling brakes in a trailer vehicle comprising a pneumatic brake system, service brakes and an electronic brake system with anti-lock control, wherein at least one axle of the trailer vehicle is fitted with spring-loaded brakes and revolution rate sensors. The method comprises: monitoring with the electronic brake system whether there is a braking demand, monitoring with the electronic brake system whether at least one wheel of at least one axle is locking up, and if there is no braking demand and at least one wheel of the at least one axle is locked while traveling, controlling the pneumatic braking system with the electronic brake system to pressurize the spring-loaded brakes and to brake the trailer vehicle by the
(Continued)

Driving position service brakes automatically and with anti-lock control. A valve arrangement is also disclosed.

9 Claims, 12 Drawing Sheets

(51) Int. Cl.
  *B60T 13/38* (2006.01)
  *B60T 8/17* (2006.01)
  *B60T 13/66* (2006.01)
  *B60T 13/68* (2006.01)

(52) U.S. Cl.
  CPC ............ *B60T 13/385* (2013.01); *B60T 13/66* (2013.01); *B60T 13/662* (2013.01); *B60T 13/68* (2013.01); *B60T 13/683* (2013.01); *B60T 17/18* (2013.01)

(58) Field of Classification Search
  CPC ........ B60T 13/662; B60T 13/38; B60T 13/68; B60T 13/66; B60T 15/206
  See application file for complete search history.

(56) References Cited

U.S. PATENT DOCUMENTS

| | | | |
|---|---|---|---|
| 8,770,674 B2* | 7/2014 | Brockmann | B60G 17/0523 303/20 |
| 2011/0012421 A1 | 1/2011 | Bensch et al. | |
| 2016/0236667 A1* | 8/2016 | Sieker | B60T 15/182 |

FOREIGN PATENT DOCUMENTS

| | | |
|---|---|---|
| DE | 60300470 T2 | 3/2006 |
| DE | 102008009882 A1 | 8/2009 |
| DE | 102009031785 A1 | 1/2011 |
| DE | 102012101871 A1 | 9/2013 |
| DE | 102013100538 A1 | 7/2014 |
| DE | 102013106260 A1 | 12/2014 |
| EP | 1538054 A2 | 6/2005 |
| EP | 1188634 B1 | 2/2008 |
| EP | 2058186 A2 | 5/2009 |
| EP | 2269880 A1 | 1/2011 |
| GB | 3B2490925 A | 11/2012 |
| GB | 2492124 A | 12/2012 |
| WO | WO2012175927 A1 | 12/2012 |

OTHER PUBLICATIONS

English language abstract and machine translation for DE3544356(A1) extracted from http://worldwide.espacenet.com database on Sep. 22, 2017, 15 pages.

English language abstract and machine translation for DE19942533 (A1) extracted from http://worldwide.espacenet.com database on Sep. 22, 2017, 10 pages.

English language abstract and machine translation for EP1188634 (B1) extracted from http://worldwide.espacenet.com database on Sep. 28, 2017, 36 pages.

English language abstract and machine translation for EP1538054 (A2) extracted from http://worldwide.espacenet.com database on Sep. 22, 2017, 13 pages.

English language abstract and machine translation for DE60300470 (T2) extracted from http://worldwide.espacenet.com database on Sep. 22, 2017, 7 pages.

English language abstract and machine translation for EP2058186 (A2) extracted from http://worldwide.espacenet.com database on Sep. 22, 2017, 27 pages.

English language abstract and machine translation for EP2269880 (A1) extracted from http://worldwide.espacenet.com database on Sep. 22, 2017, 21 pages.

English language abstract and machine translation for DE102009031785 (A1) extracted from http://worldwide.espacenet.com database on Sep. 27, 2017, 18 pages.

English language abstract and machine translation for DE102012101871 (A1) extracted from http://worldwide.espacenet.com database on Sep. 22, 2017, 37 pages.

English language abstract and machine translation for DE102013100538 (A1) extracted from http://worldwide.espacenet.com database on Sep. 27, 2017, 52 pages.

English language abstract and machine translation for DE102013106260 (A1) extracted from http://worldwide.espacenet.com database on Sep. 22, 2017, 29 pages.

* cited by examiner

Driving position

Overload protection

Automatic braking

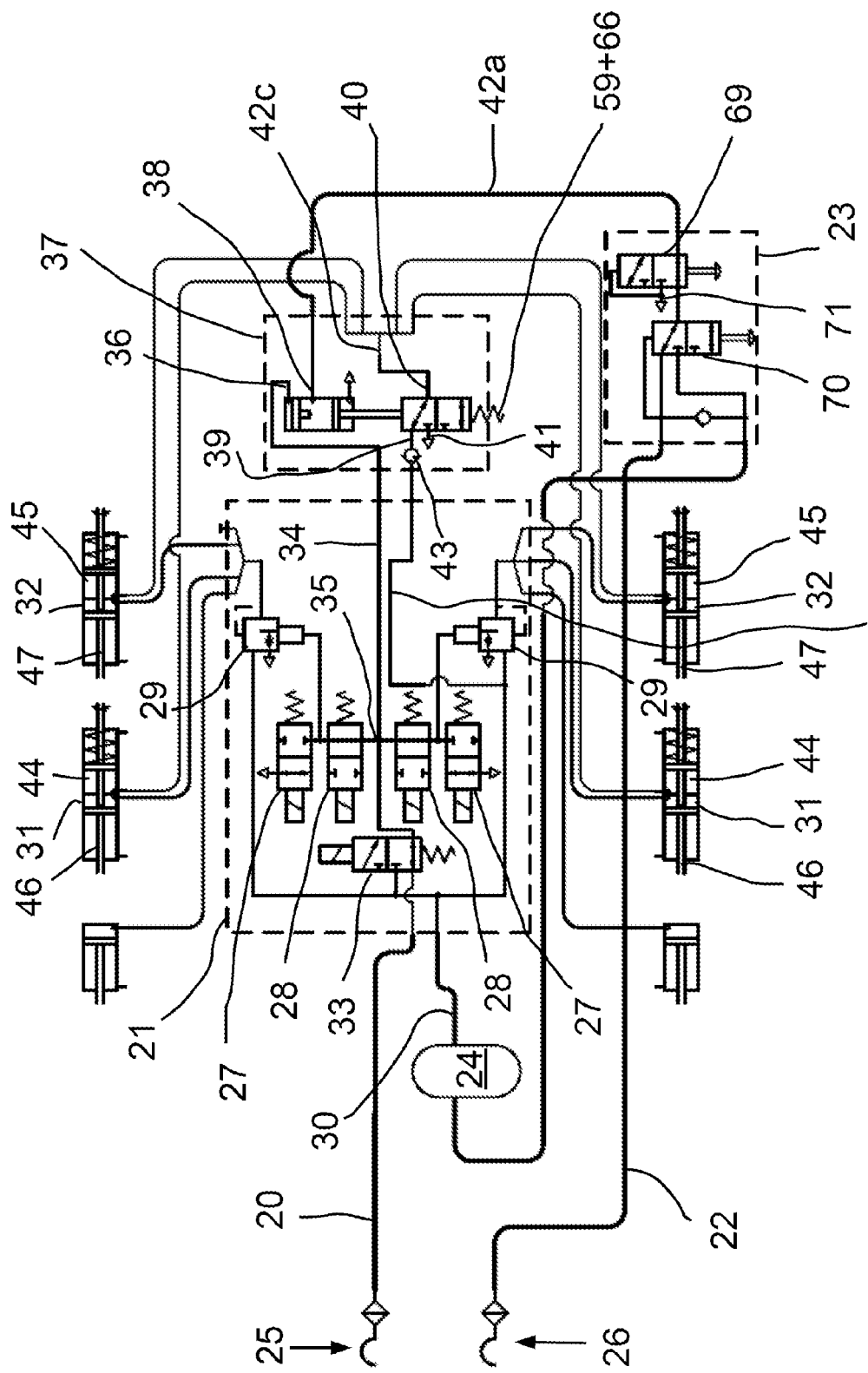
Fig. 4 Driving position

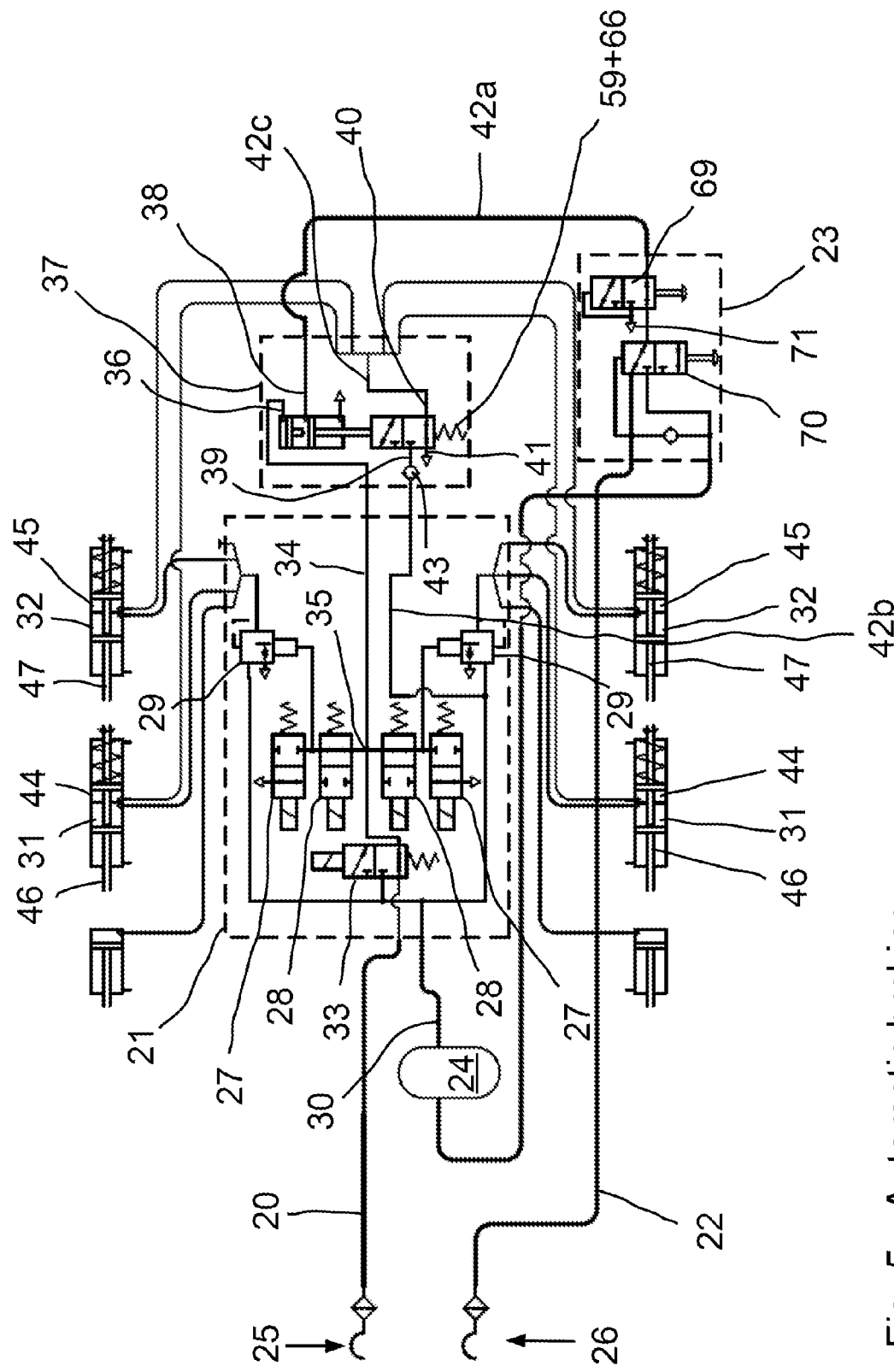
Fig. 5 Automatic braking

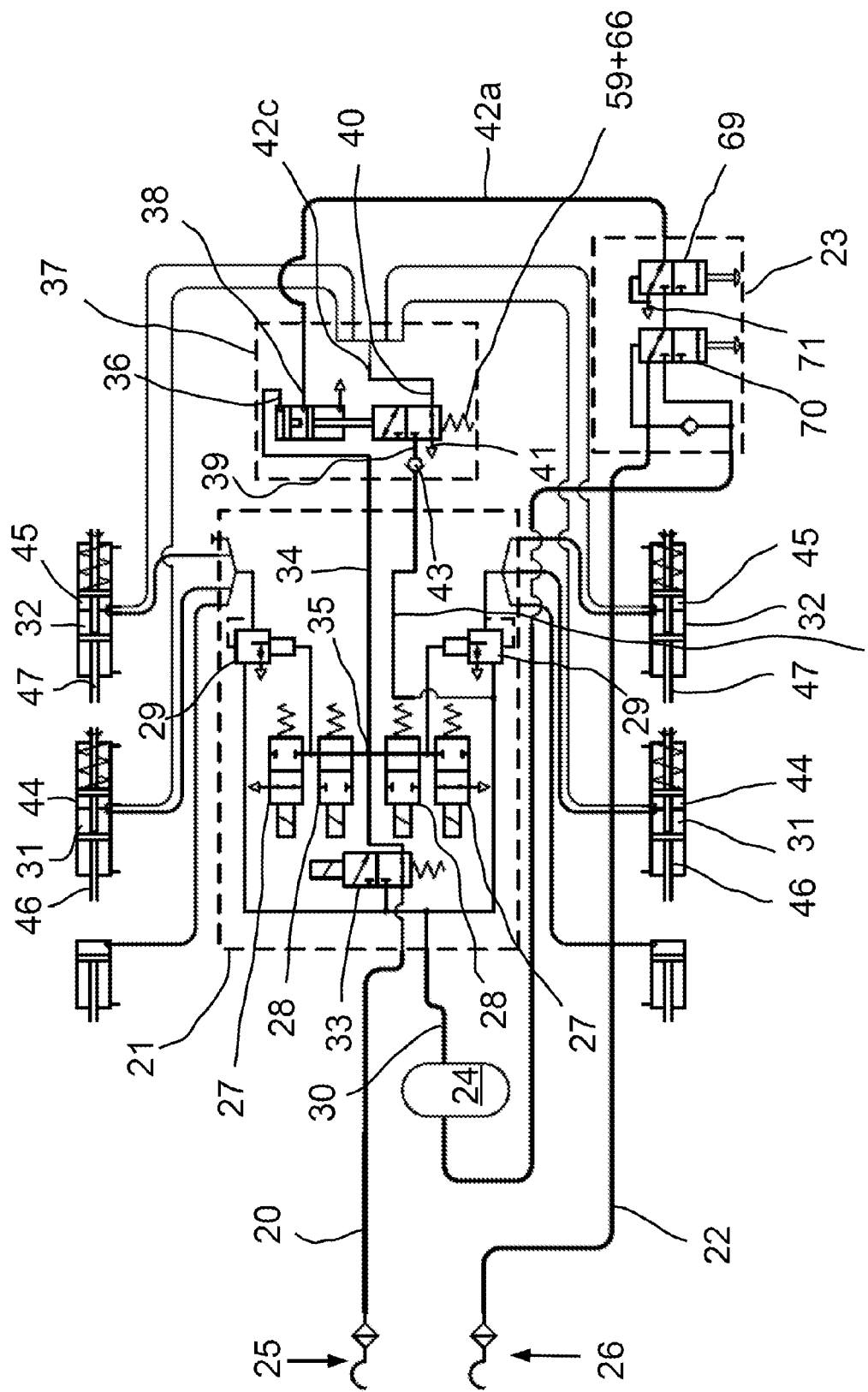
Fig. 6 Parking position

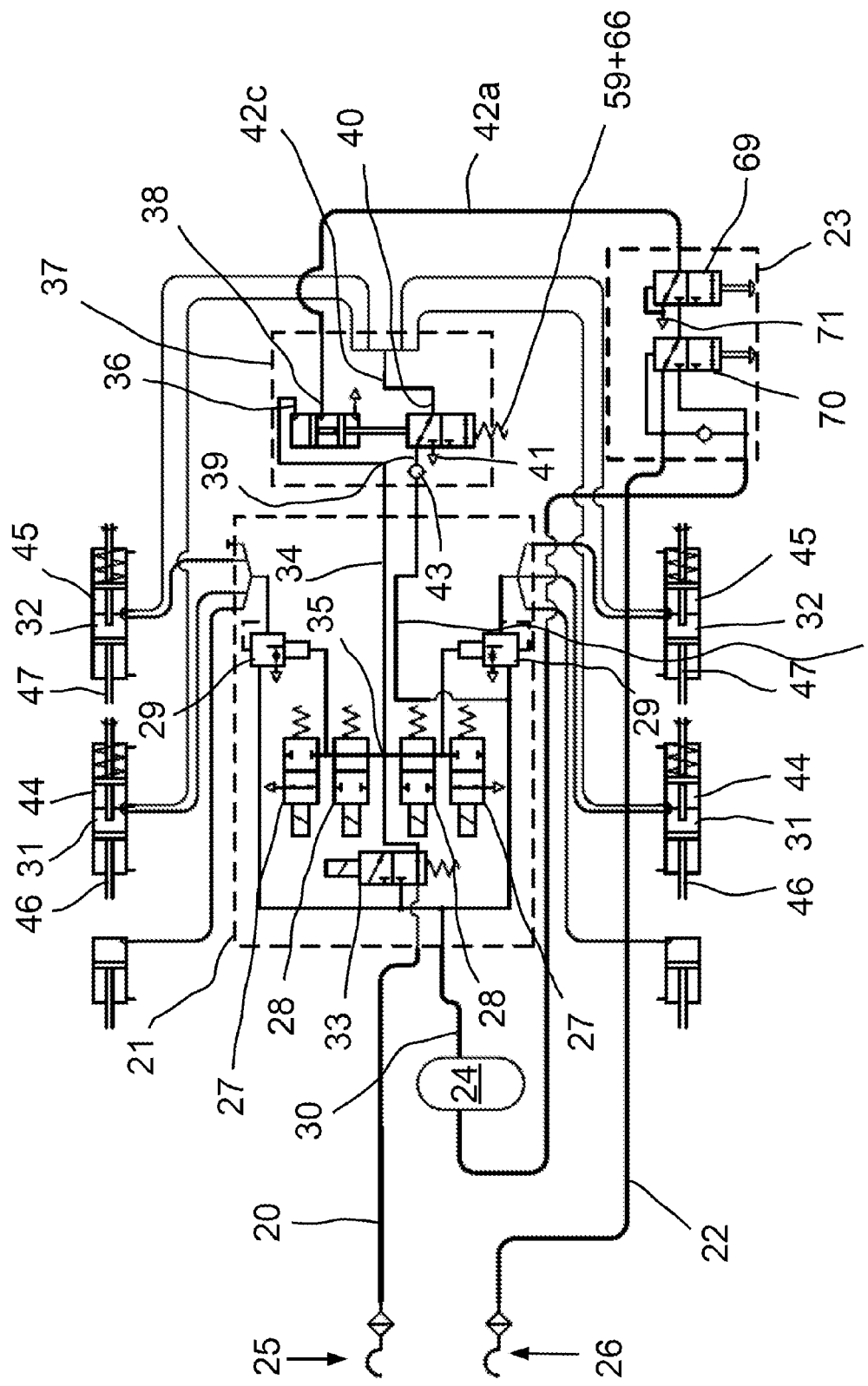
Fig. 7 Overload protection

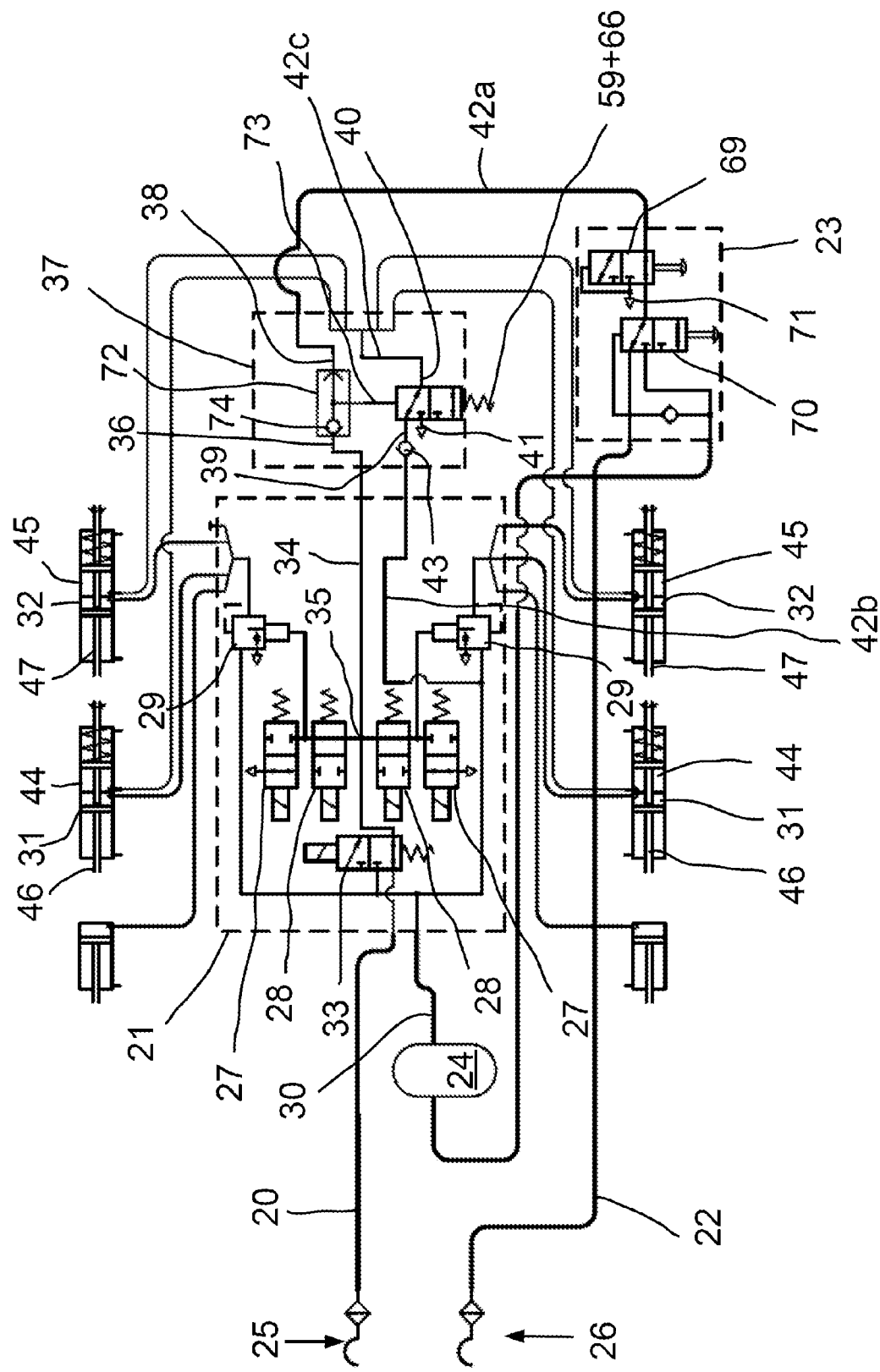
Fig. 8  Driving position

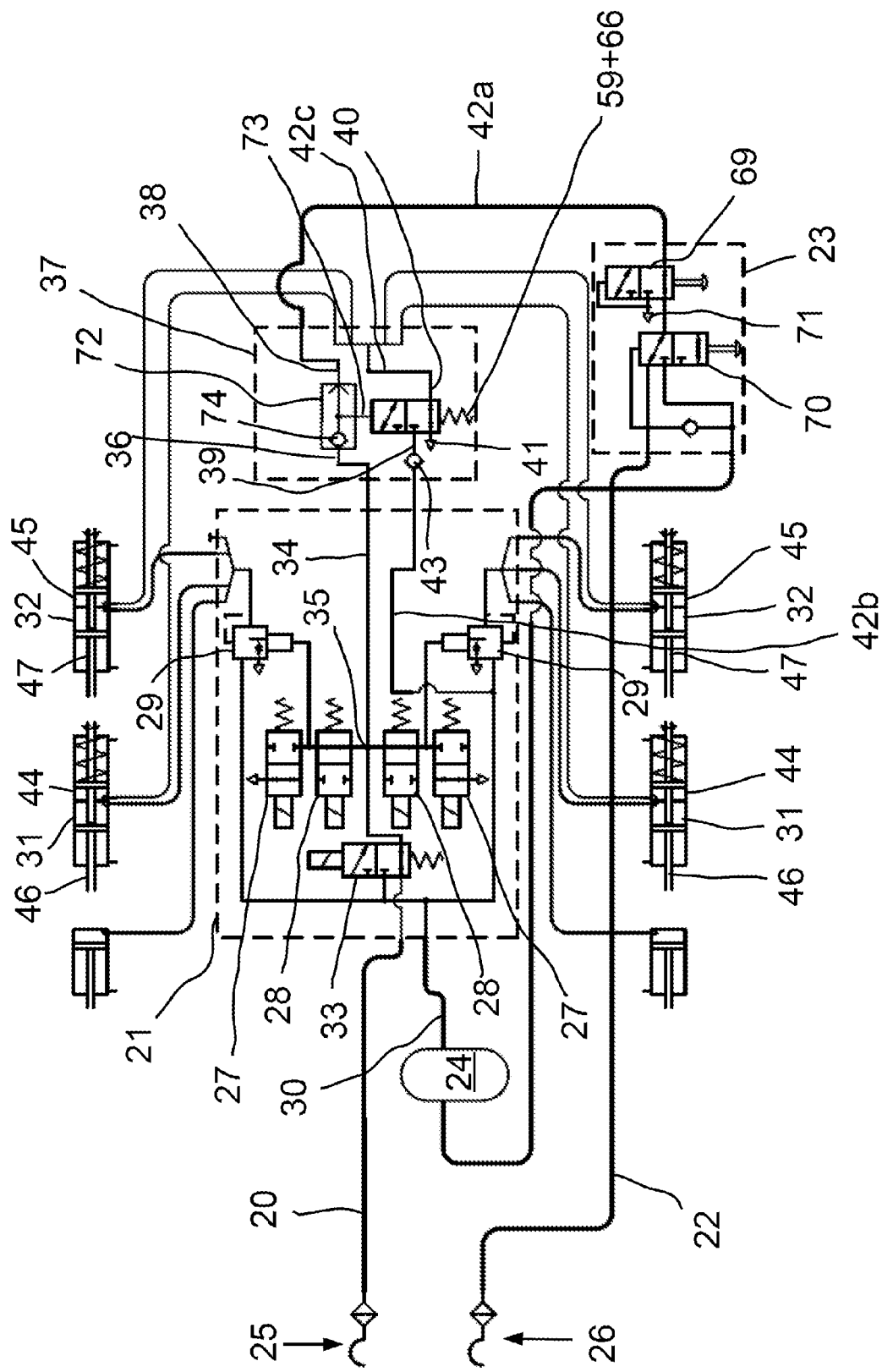
Fig. 9  Automatic braking

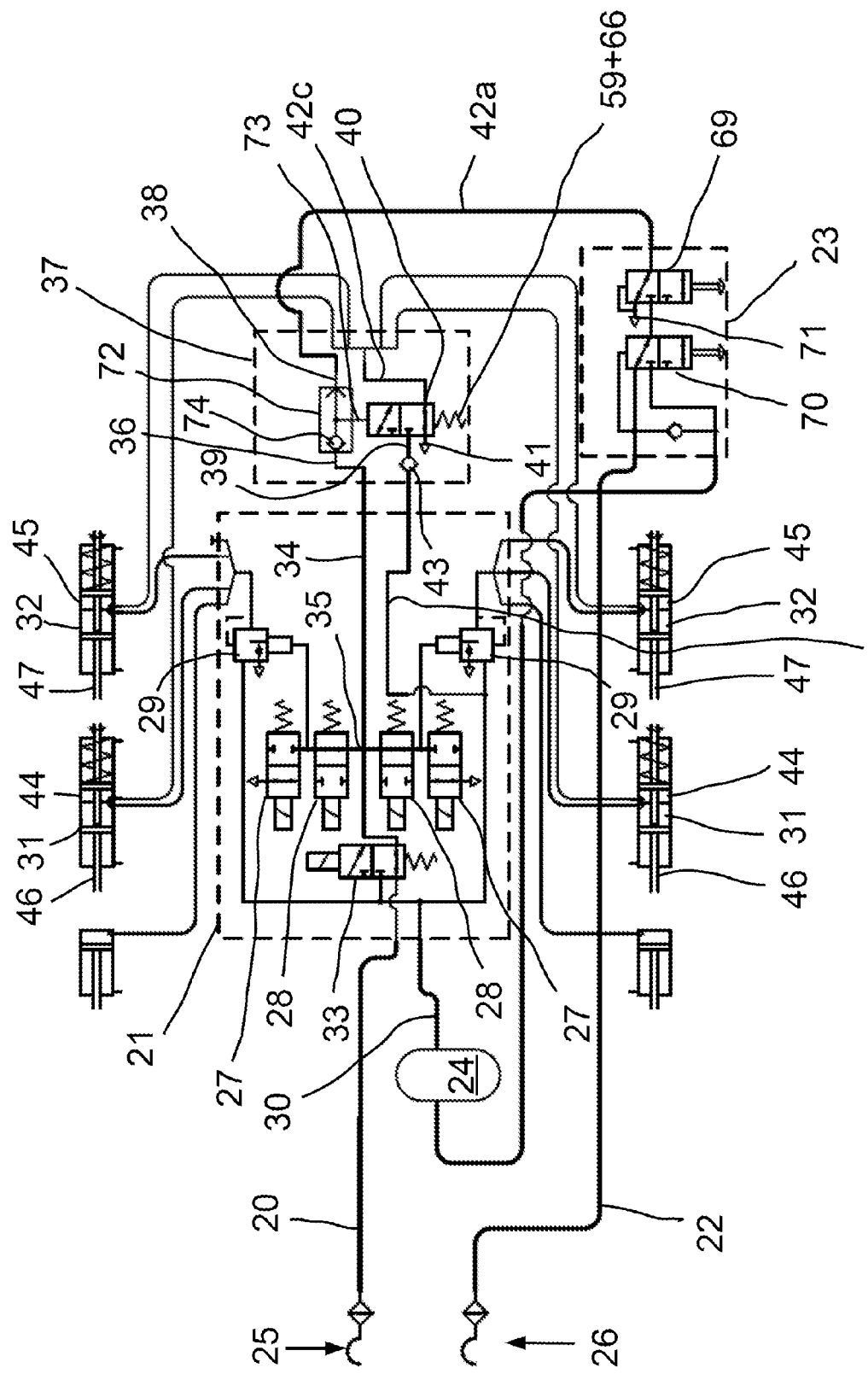
Fig. 10  Parking position

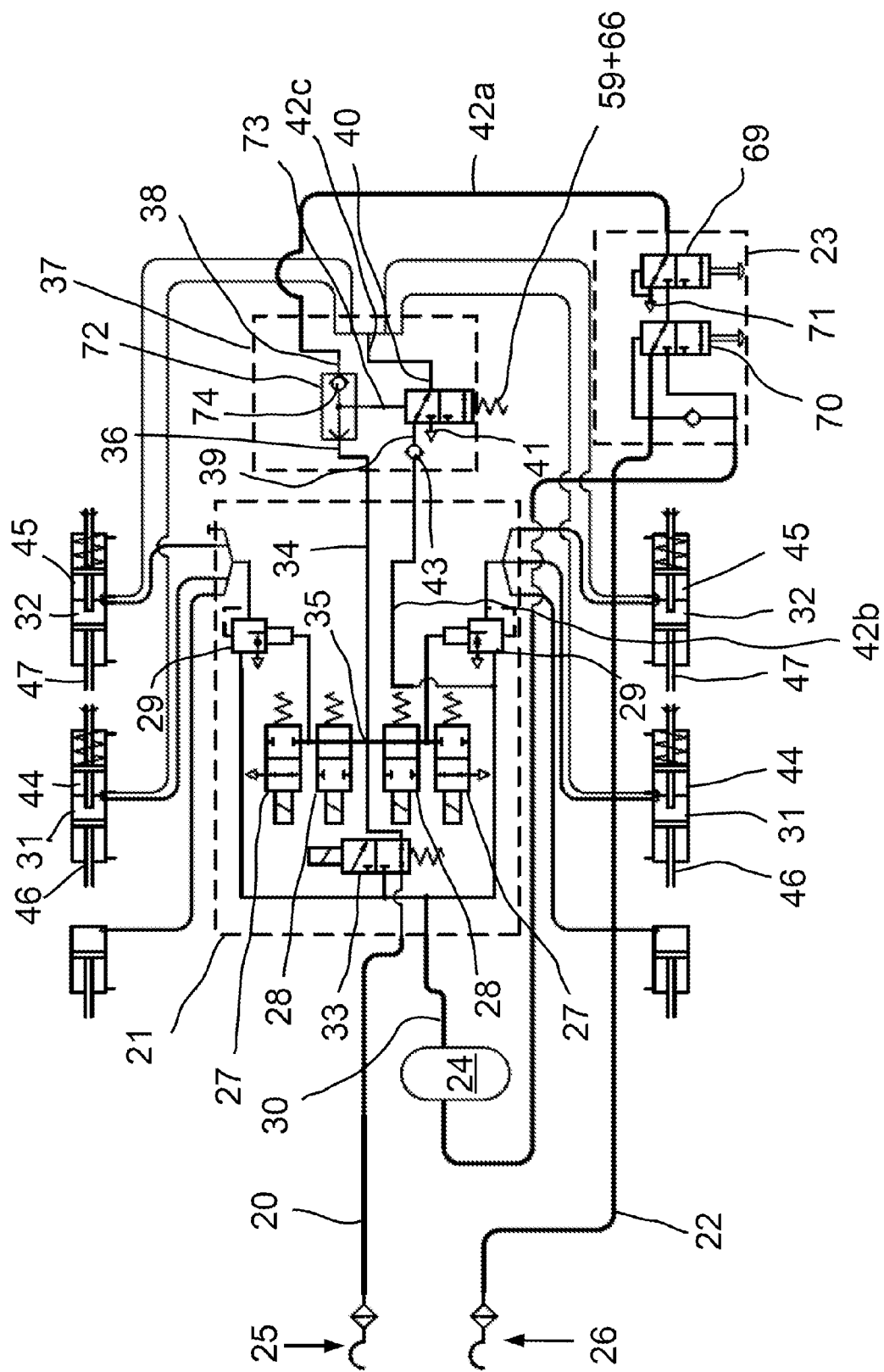
Fig. 11  Overload protection

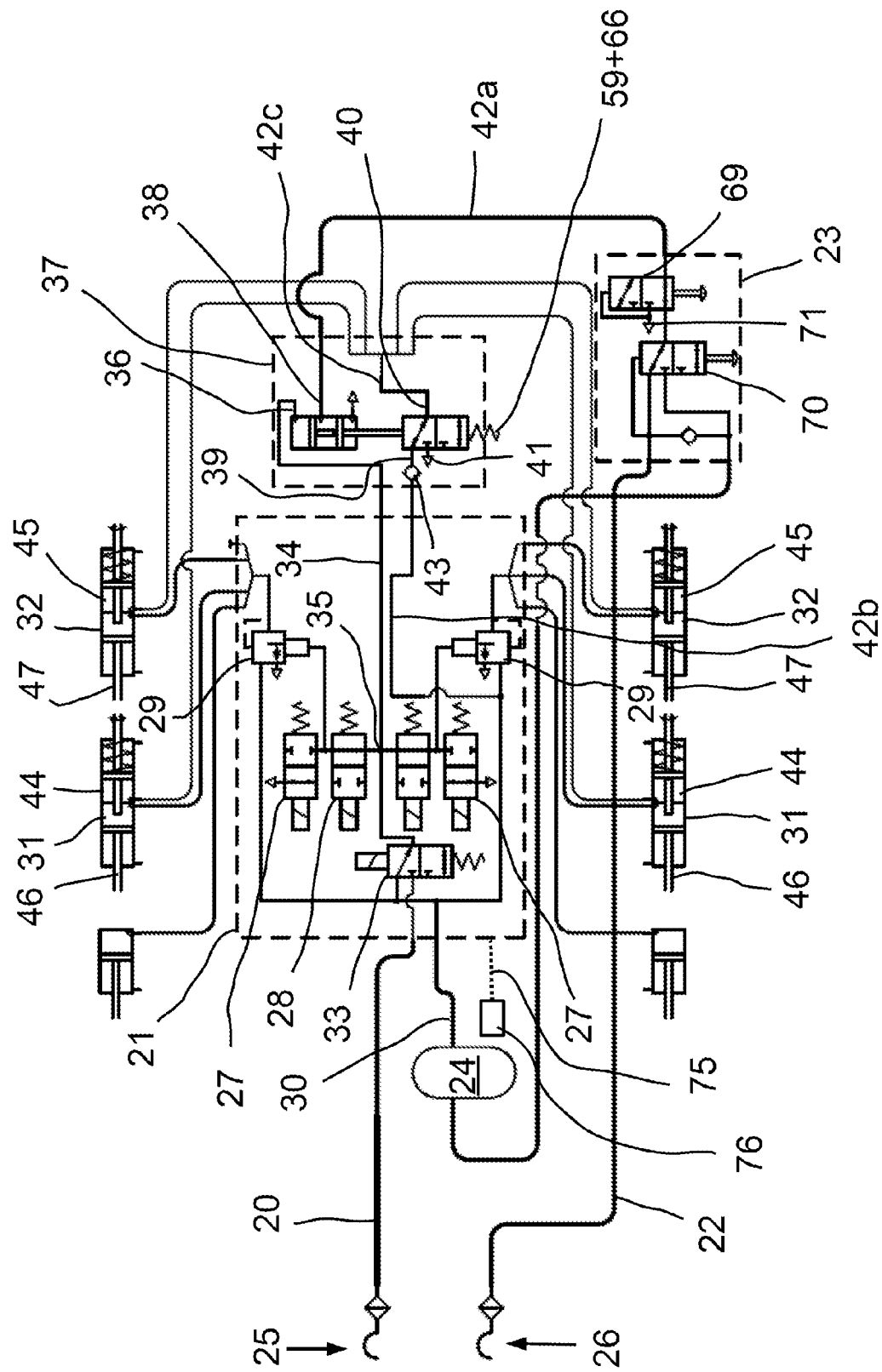
Fig. 12 Anti-lock protection

METHOD FOR CONTROLLING BRAKES IN A TRAILER VEHICLE

CROSS-REFERENCE TO RELATED APPLICATIONS

This application is the National Stage of International Application No. PCT/EP2016/000920, filed on 4 Jun. 2016, which claims priority to and all advantages of German Patent Application No. 10 2015 007 384.2, filed on 10 Jun. 2015, the content of which is hereby incorporated by reference.

FIELD OF THE INVENTION

The invention generally relates to a method for controlling brakes in a trailer vehicle with a pneumatic brake system, service brakes and an electronic brake system with anti-lock control, wherein at least one axle of the trailer vehicle is fitted with spring-loaded brakes and revolution rate sensors, and wherein the pneumatic brake system comprises a reservoir container with a reservoir container pressure.

BACKGROUND OF THE INVENTION

Modern utility vehicles—towing vehicles and trailer vehicles—are equipped with a pneumatic brake system, which is at a higher level than an electronic brake system. Moreover, an anti-lock control is provided, with which locking of the wheels during braking is prevented. For this purpose, brake cylinders of service brakes are pressurized and vented via electronically actuated solenoid valves as required by the designated regulations. The solenoid valves are actuated via an electronic control unit, which receives all the data necessary for the actuation of the brakes, including the operation of a brake pedal by the driver and the data from revolution rate sensors (also referred to as ABS sensors) at wheels of the vehicle.

The trailer vehicle is connected to the towing vehicle via a supply pressure line, a control pressure line and an electric line. Data are also transmitted via the electric line.

In the trailer vehicle, there is a reservoir container with a reservoir container pressure, so that a compressed air supply for actuation of the brakes of the trailer vehicle is available even after the disconnection of the supply pressure line.

The trailer vehicle comprises so-called spring-loaded brakes. Once the reservoir container pressure falls below a limit value, brake cylinders of the spring-loaded brakes are automatically vented and the trailer vehicle is braked. During this the wheels can lock.

The trailer vehicle is equipped with a further emergency brake function. In the event of the supply pressure line between the towing vehicle and the trailer vehicle being cut off, the brake cylinders of the spring-loaded brakes are also automatically vented, so that the trailer vehicle is braked. The wheels can lock in this case as well.

Typically, the trailer vehicle comprises a dedicated electronic control unit for the brakes, which also receives digital brake signals from the towing vehicle via the electric line.

In EP 1 538 054, a brake system of a trailer vehicle is represented, with which for the case of automatic braking by means of spring-loading, the wheels on one side lock, whereas anti-lock control is effective for the wheels on the other side.

SUMMARY OF THE INVENTION

The present invention provides a method with which wheels on both sides of a trailer vehicle can be braked with anti-lock control for the case of automatic braking via spring-loaded brakes.

The method comprises:
a) monitoring with the electronic brake system whether there is a braking demand,
b) monitoring with the electronic brake system whether at least one wheel of the at least one axle is locked, and
c) if there is no braking demand and at least one wheel of the at least one axle is locked while traveling, controlling the pneumatic brake system with the electronic brake system so that the spring-loaded brakes are pressurized and the trailer vehicle is braked by the service brakes automatically and with anti-lock control.

With the revolution rate sensors, the current revolution rate of the wheels is detected and transmitted to the control unit of the brakes. In the control unit, the data are evaluated and it may be determined whether the wheels are locking. The braking demand of the driver is also detected in the control unit, because the operation of the brake pedal by the driver is transmitted via the electric line (electric brake line according to ISO 11992) from the towing vehicle to the control unit in the trailer vehicle. If the conditions exist, solenoid valves provided for this purpose are actuated to pressurize the spring-loaded brake cylinder. Moreover, the trailer vehicle is braked by the service brakes (or the service brake cylinders thereof). Solenoid valves are also actuated by the control unit for this purpose. The braking is carried out typically to the maximum extent and using anti-lock control.

From the circumstances in which at least one wheel of the trailer vehicle is locking, it is concluded that the spring-loaded brakes (or spring-loaded brake cylinders) are vented and the supply pressure line is disrupted or there is a defect with a similar effect. In addition, the supply pressure in the supply pressure line can be monitored by a suitable sensor.

Spring-loaded brake cylinders and service brake cylinders are pressurized with air from the reservoir container of the trailer vehicle. Typically, the air supply in the reservoir container is large enough to enable a few full braking actions.

In certain embodiments, it is assumed that that there is a braking demand, or a braking demand exists, if a pressure above a limit value is measured in a pneumatic control pressure line in the trailer vehicle or in a towing vehicle of the trailer vehicle or if a signal for actuation of the service brakes is transmitted on an electric brake line. The pressure in the pneumatic control pressure line is detected and is available in the control unit, as is the signal transmitted on the electric brake line.

Advantageously, the trailer vehicle may be decelerated to a standstill. After detecting the standstill via the revolution rate sensors or in another way, the spring-loaded brakes can also be vented again in a controlled manner (triggered by the control unit).

In various embodiments, a longitudinal deceleration of the trailer vehicle is monitored and the spring-loaded brakes are pressurized and the trailer vehicle is automatically braked only if the longitudinal deceleration exceeds a limit value. For this purpose, the data of a deceleration sensor are delivered to the control unit. Owing to the additionally queried condition, the method can be carried out even more reliably.

In certain embodiments, a pneumatically actuated valve unit pressurizes the spring-loaded brakes with the reservoir container pressure if the pneumatically actuated valve unit applies a pressure above a limit value at a control input and that the reservoir container pressure is delivered to the control input of the valve unit for triggering the pressurization of the spring-loaded brakes. The reservoir container pressure has a dual function in this case: on the one hand, the reservoir container pressure is required immediately for pressurizing the spring-loaded brake cylinders; on the other hand, the reservoir container pressure is used at the same time as the pressure for the control input. The delivery of the reservoir container pressure to the control input of the pneumatically actuated valve unit is initiated by a solenoid valve, which in the normal case delivers the control pressure of the brake system to the control input. But if the conditions of the method are met, the solenoid valve switches over so that the reservoir container pressure is then delivered to the control input of the valve unit.

A valve arrangement is also provided by the present invention. The valve arrangement is for a pneumatic brake system of a trailer vehicle, typically in connection with an electronic brake system. The pneumatic brake system comprises a reservoir container with reservoir container pressure, with a pneumatically actuated valve unit for pressurizing spring-loaded brakes with reservoir container pressure if a pressure above a limit value is applied at a control input of the valve unit. The pneumatic brake system further comprises a solenoid valve, which is connected to a control pressure of the pneumatic brake system and to the reservoir container pressure and can switch between the control pressure and the reservoir container pressure, and which is also connected to the control input of the valve unit, so that control pressure or reservoir container pressure is applied at the control input of the valve unit, depending on the position of the solenoid valve. There is therefore a distinction between a solenoid valve and the pneumatically actuated valve unit with a control input. Control pressure and reservoir container pressure are applied to the solenoid valve. Depending on the position of the solenoid valve, control pressure or reservoir container pressure is delivered to the control input of the pneumatically actuated valve unit. Once the pressure at the control input of the valve unit exceeds a limit value, the spring-loaded brake cylinders are pressurized. The reservoir container pressure normally lies above the limit value. Thus, by switching the solenoid valve to reservoir container pressure, pressurization of the spring-loaded brake cylinders can be rapidly achieved.

A trailer vehicle with a pneumatic brake system, an electronic brake system and the valve arrangement is also provided by the present invention.

Finally, an electronic control unit (brake control unit) for carrying out the method, for controlling the valve arrangement and/or for the trailer vehicle is additionally provided by the present invention. In particular, the control unit controls the switching state of the solenoid valve or switching from control pressure to reservoir container pressure and back.

BRIEF DESCRIPTION OF THE DRAWING

The invention is described in greater detail below with reference to the accompanying figures, in which:

FIG. 4 shows the pneumatic brake system of the trailer vehicle with the dual piston valve in the driving position, FIG. 5 shows the pneumatic brake system with the dual piston valve in the position for automatic braking, FIG. 6 shows the pneumatic brake system with the dual piston valve in a parking position, FIG. 7 shows the pneumatic brake system with the dual piston valve in the position for overload protection, FIG. 8 shows the pneumatic brake system with a select-high valve in the driving position, FIG. 9 shows the pneumatic brake system with the select-high valve in the position for automatic braking, FIG. 10 shows the pneumatic brake system with the select-high valve in the parking position, FIG. 11 shows the pneumatic brake system with the select-high valve in the position for overload protection, FIG. 12 shows the pneumatic brake system with the dual piston valve and anti-lock protection turned on, and FIG. 13 shows the pneumatic brake system of the trailer vehicle in a partly simplified representation.

DETAILED DESCRIPTION

Figure 1:
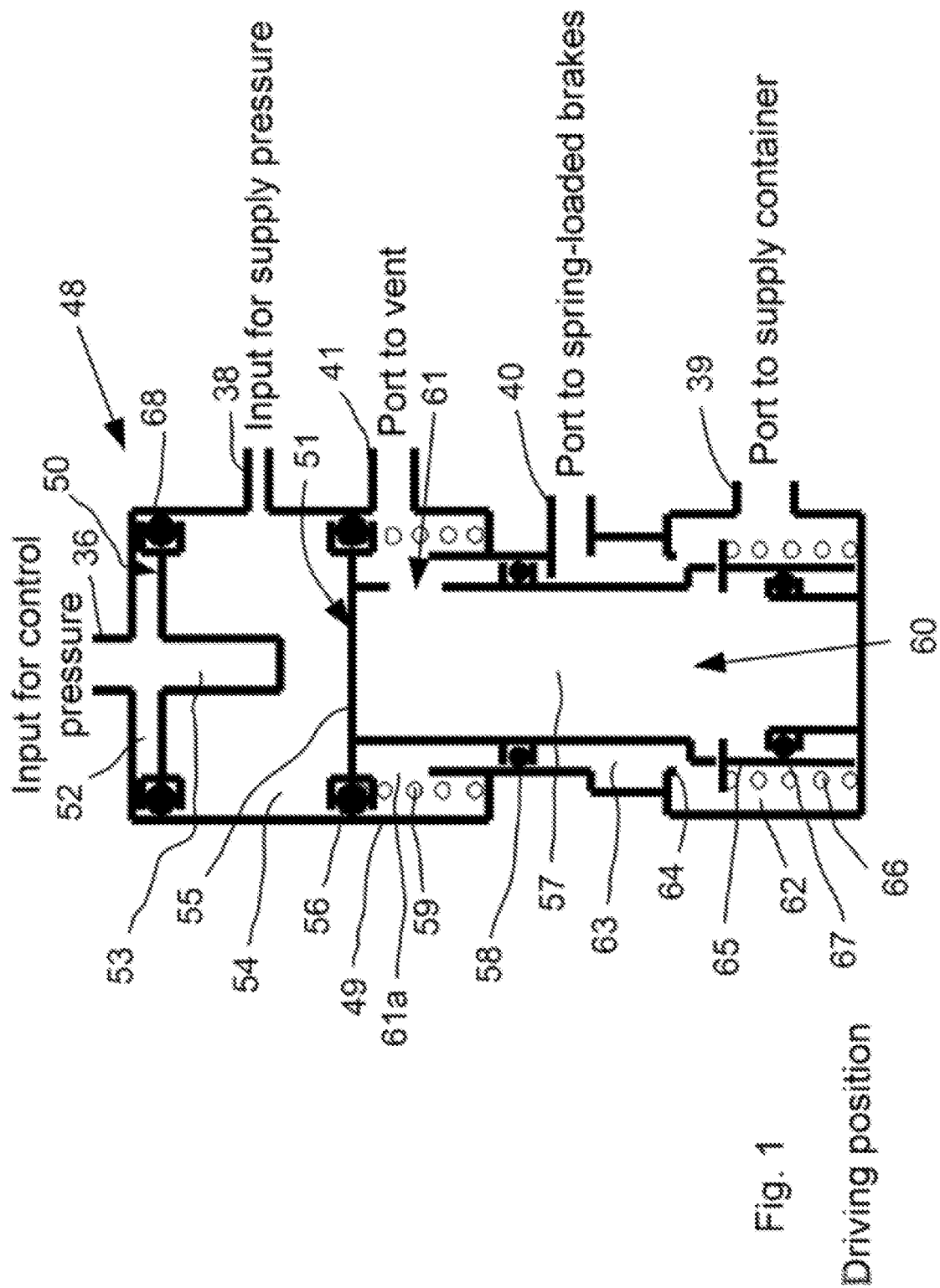
FIG. 1 shows a dual piston valve for a pneumatic brake system of a trailer vehicle in a driving position.

With reference to the specific embodiment of the Figures, wherein like numerals generally indicate like parts throughout the several views, FIG. 4 shows a pneumatic brake system for a trailer vehicle. A control pressure line 20 leads to a trailer brake module 21. A supply pressure line 22 leads to a parking release valve 23 and from this further via a reservoir container 24 to the trailer brake module 21. According to certain legal regulations, the control pressure line 20 comprises a yellow coupling head 25 for a control port and the supply pressure line 22 comprises a red coupling head 26 for a supply port.

The trailer brake module 21 may be constructed in a known way, namely with two solenoid valves 27, 28 and one relay valve 29 on each side of the vehicle. The delivery of the control pressure to the relay valves 29 is controlled via the solenoid valves 27, 28. The latter are connected at the same time to the reservoir container pressure from the reservoir container 24 via a line 30 with branches and output the controlled service brake pressure to the service brake cylinders 31, 32.

A further component of the trailer brake module 21 is a redundancy valve 33 in the form of a solenoid valve, with which the connection between the control pressure line 20 and a line 34 can be separated and transposed. In this way, the line 34 can be alternatively connected to the line 30 and the reservoir container pressure from the reservoir container 24. Moreover, the line 34 connects the solenoid valves 28 of both sides of the vehicle to each other via a branch 35.

Furthermore, the line 34 (with the suitably switched redundancy valve 33) connects the control pressure line 20 to a first control input 36 of a valve arrangement 37. The valve arrangement 37 has in particular the function of overload protection and comprises a second control input 38 and a first port 39, a second port 40 and a third port 41 for this purpose, see also FIGS. 1 through 3.

The second control input 38 is connected to the supply pressure line 22 via a line 42a and the parking release valve 23. The first port 39 is connected to the reservoir container 24 via a line 42b, a non-return valve 43 and the trailer brake module 21. The second port 40 is connected to spring-loaded brake cylinders 44, 45 on both sides of the vehicle via a line 42c and branches. The third port 41 is a venting port.

In the brake system shown, the service brake cylinders 31, 32 are components of a so-called combi-cylinder, namely with integrated spring-loaded brake cylinders 44, 45, wherein the forces act on the same brake pistons 46, 47 when the service brake is operated on the one hand and spring-loaded brakes are operated on the other hand.

Figure 3:
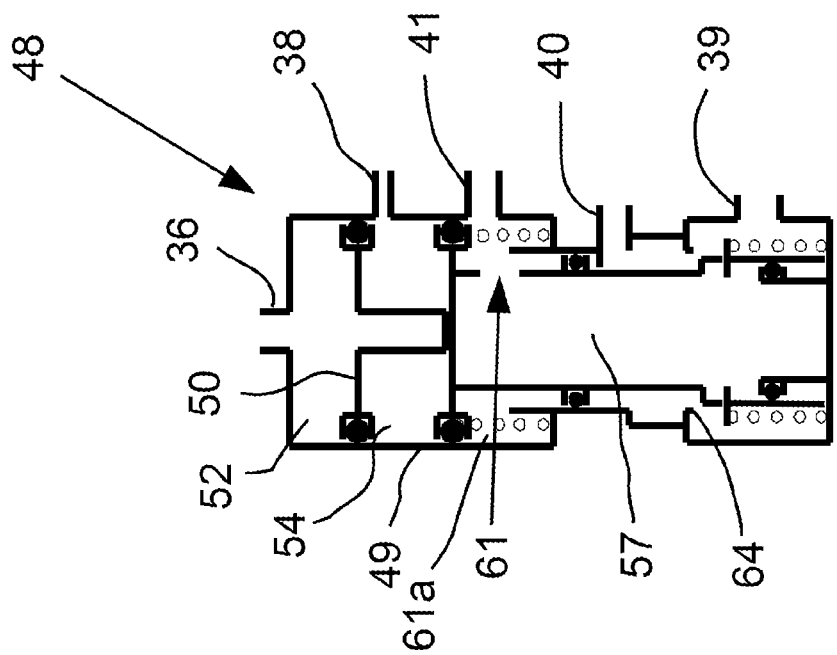
FIG. 3 shows the dual piston valve in a position for overload protection.
Figure 2:
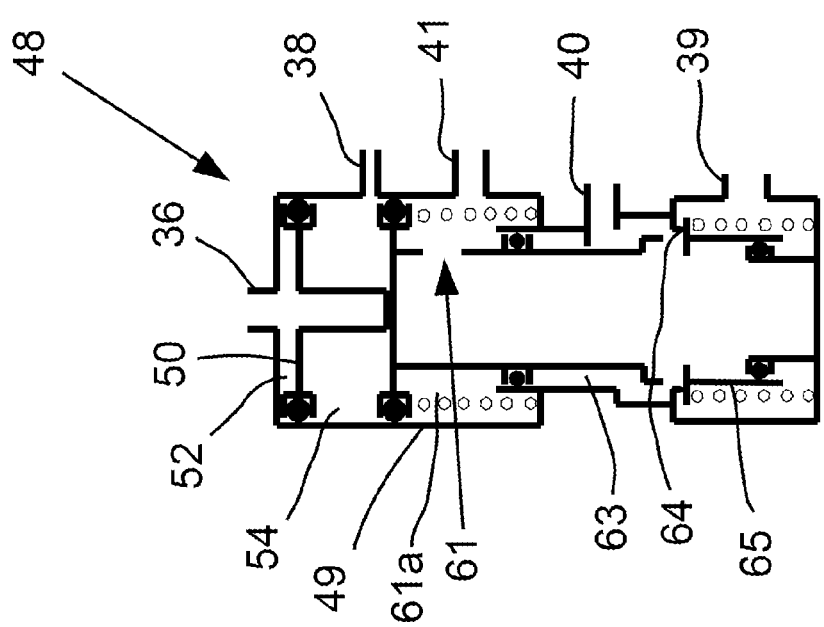
FIG. 2 shows the dual piston valve in a position for automatic braking.

The valve arrangement 37 contains a valve unit 48 of the dual piston valve type, see FIG. 1-3, in this case with a housing 49 in which two pistons 50, 51 can be moved coaxially for controlling the valve functions. In an upper, first cylinder chamber 52, the first piston 50 can be moved downwards towards the second piston 51 by a control pressure delivered via the control input 36. In this case, the first piston 50 comprises a downwards-directed protrusion 53 with reduced diameter, so that a second first cylinder chamber 54 is formed around and below the protrusion 53. The second control input 38 leads into the second cylinder chamber 54 between the two pistons 50, 51. Owing to the protrusion 53, the two pistons 50, 51 are always at a minimum distance from each other, so that the second control input 38 cannot be closed by the pistons 50, 51.

The second piston 51 is implemented in a stepped form, with a broad head 55 with a seal 56 and a narrower protrusion 57 with a seal 58. The head 55 contacts a coil spring 59 at the edge that forces the second piston 51 towards the first piston 50.

The protrusion 57 of the second piston 51 is hollow and is provided with an opening 60 at the bottom and with an opening 61 on the side close to the head 55. The two openings 60, 61 are closed off from each other or separated from each other on the outside by the seal 58. In the region of the opening 61, an annular space 61a is formed around the protrusion 57 that in addition to the opening 61 also comprises the third port 41 as an opening and is otherwise closed by the seals 56, 58.

The housing 49 comprises in the lower region thereof a broader annular cylinder chamber 62 at the bottom and above this a somewhat narrower, annular first cylinder chamber 63. The second port 40 is at the same time an opening of the cylinder chamber 63 and the first port 39 is an opening of the cylinder chamber 62.

At a transition between the two cylinder chambers 62, 63, an inner circumferential edge 64 is formed, against which an auxiliary piston 65 retained in the bottom first cylinder chamber 62 is pressed upwards via a coil spring 66. The coil spring 66 is implemented as relatively weak and its effect is only that the auxiliary piston 65, if further forces are not acting, contacts the circumferential edge 64 and terminates the lowest first cylinder chamber 62 at that point. The auxiliary piston 65 is generally open at both axial ends and is guided up to a seal 67 on the inside.

The first piston 50 comprises a peripheral seal 68 on the outside. The protrusion 57 of the second piston 51 is guided in the cylinder chamber 63 with the seal 58 on the outside.

The directional statements "up" and "down" relate to the orientation of the valve unit 48 in the figures. In practice, the valve unit 48 can adopt another position, so that the directional statements are adapted. The valve unit 48 is implemented here as a 3/2-way valve with an upper switching position in FIGS. 2, 5, 6 and a lower switching position in FIGS. 1, 3, 4, 7.

Owing to the design of the valve unit 48, the functions of the valve arrangement 37 visible in FIG. 4 are combined in a housing (in the housing 49). The functions of the valve arrangement 37 are described below with reference to FIGS. 4-7.

In the driving position according to FIG. 4, the pneumatic brake system is in a ready state. This means that the spring-loaded brake cylinders 44, 45 are pressurized by reservoir container pressure from the reservoir container 24. For this purpose, the first port 39 is connected to the second port 40 via the valve arrangement 37. The valve arrangement 37 is disposed in an actively switched second switching position. The second switching position is triggered by the supply pressure of at least 2.5 bar on the supply pressure line 22 applied to the second control input 38. The supply pressure is delivered to the second control input 38 from the supply pressure line 22 through the parking release valve 23 and through the line 42a for this purpose. The supply pressure applied there acts upon the second piston 51, so that the valve unit 48 assumes the driving position according to FIG. 1. In this case, no pressure is applied at the first control input 36, the first piston 50 is not acted upon and is disposed in the upper position thereof. Moreover, as no control pressure is applied from the control pressure-line 20, the brake cylinders 30, 31, 32 are also unpressurized.

FIG. 5 shows the components of the pneumatic brake system following automatic braking of the trailer vehicle by loss of the supply pressure in the supply pressure line 22, e.g. owing to removal of the red coupling head 26. The second control input 38, likewise the first control input 36, is also unpressurized without actuation of the service brakes. Accordingly, both cylinder chambers 52, 54 are vented and both pistons 50, 51 are moved upwards by the pressure of the spring 59, see also FIG. 2. In contrast to FIG. 4, in FIG. 5 the valve arrangement 37 is disposed in an upper switching position. The first port 39 is shut off. The second port 40 is connected to the third port 41 for venting the spring-loaded brake cylinders 44, 45. The spring-loaded brake cylinders 44, 45 are vented and the trailer vehicle is decelerated or is braked. The service brakes are inactive.

In FIG. 6, a parking position of the pneumatic brake system is shown. The valve arrangement 37 assumes the same switching position as in FIG. 5 during automatic braking following loss of the supply pressure in the supply pressure line 22. In FIG. 6, the supply pressure can however continue to be present in the supply pressure line 22. The pressure loss at the second control input 38 is instead achieved by switching the parking release valve 23. This contains at least two valves, namely a parking valve 69 and a release valve 70. The release valve 70 is disposed in the same switching position in all the states that are shown here. On the other hand, in FIGS. 4 and 5 the parking valve 69 is disposed in a driving position and only in FIG. 6 in a parking position. As a result, the second control input 38 is connected to a vent 71 on the parking valve 69 and is thus unpressurized. The service brake is inactive. The first control input 36 is also unpressurized. The cylinder chambers 52, 54 are vented. The valve arrangement assumes the same position as for automatic braking in FIG. 5. As a result, the second port 40 is connected to the third port 41 for venting the spring-loaded brake cylinders. The vehicle is braked.

In FIG. 7, the overload protection function of the valve arrangement 37 can be seen. Double loading within the service brake cylinder 30, 31 and 32 by actuation of the service brake on the one hand and by the force of the vented spring-loaded brake cylinders 44, 45 on the other hand is to be avoided. It is operated from the parking position according to FIG. 6 with the parking valve 69 switched. According to FIG. 7, control pressure is additionally applied in the control pressure-line 20. This controls the delivery of the reservoir container pressure from the reservoir container 24 to the service brake cylinders 31, 32 via the solenoid valves 27, 28 and relay valves 29. The more control pressure is controlled, the higher are the additional mechanical forces within the service brake cylinders 31, 32. As the spring-loaded brake cylinders 44, 45 are already vented, the total forces can be too strong. The control pressure is moreover guided via the first control input 36 into the first cylinder chamber 52, see FIG. 3. Depending on the stiffness and the characteristic curve of the coil spring 59 (and the coil spring 66), the valve arrangement 37 switches from the parking position according to FIG. 5 into the position according to FIG. 7. As a result, the first port 39 is connected to the second port 40 and the spring-loaded brake cylinders 44, 45 are pressurized with pressure from the reservoir container 24. As a result, only the service brakes are still effective. Once the control pressure decreases again, the valve arrangement 37 switches back to the position according to FIG. 6 and the spring-loaded brake cylinders 44,45 are vented again.

In the case of the overload protection represented using FIG. 7, the pressurization and venting of the spring-loaded brake cylinders 44, 45 are not carried out in proportion to the change of the control pressure. Rather, the spring-loaded brake cylinders 44, 45 are vented or pressurized depending on exceeding or falling below a control pressure limit value. The limit value is 2.5 bar or more here. The overload protection is also effective starting from the state shown in FIG. 5 (automatic braking).

FIGS. 8-11 concern, as do FIGS. 4-7, the various states driving position (FIG. 8), automatic braking (FIG. 9), parking position (FIG. 10) and overload protection (FIG. 11). In contrast to FIGS. 4-7, the valve arrangement 37 is implemented in a different way, namely not with a dual piston valve, but with an additional select-high valve 72 for controlling the two states of the valve arrangement 37 and the connection of the ports 39, 40, 41. The select-high valve 72 passes the higher of the two pressures present at the two control inputs 36, 38 to a third control input 73. Depending on the pressure present here, the valve arrangement 37 assumes the associated switching position. An implementation as a 3/2-way valve and by modifying the valve unit 48 in FIGS. 1-3 is possible in practice. The first piston 50 is dispensed with, the control input 38 remains closed and the control input 36 is replaced by the third control input 73. This is supplied from the select-high valve 72.

The select-high valve 72 contains a locking function between the control inputs 36, 38, so that only the respectively applied higher pressure passes to the control input 73 and cannot escape via the control input with the lower pressure. The sign of the pressure difference at the control inputs 36, 38 can be seen in FIGS. 8-11 using the position of a ball 74. In FIG. 8 (driving position), supply pressure is applied to the control input 38, whereas a lower or no control pressure is applied to the control input 36. In FIG. 9 (automatic braking), the control input 38 is unpressurized from the driving position by disconnection of the supply pressure line 22, whereas the control input 36 is unpressurized anyway. The ball 74 remains in front of the control input 36 until there is also no longer any pressure at the control input 38.

In FIG. 10 (parking position), the driving position according to FIG. 8 is also the starting point of the considerations. In the driving position, the full supply pressure is present at the control input 38 (as in FIG. 8). The vehicle is braked by the service brakes by controlling the control pressure. In the parking position, the service brakes are basically not actuated, i.e. there is no longer any pressure at the control input 36 and at the same time the control input 38 is vented via the parking valve 69. Until the final venting of the control input 38, the ball 74 remains in the position according to FIG. 10, i.e. on the left.

The spring-loaded brake cylinders 44,45 are vented and the spring-loaded brakes are holding the trailer vehicle.

Starting from the parking position according to FIG. 10, the position according to FIG. 11 (overload protection) results on actuation of the service brake during the parking position. Control pressure is then acting at the control input 36. The ball 74 moves into the right position according to FIG. 11 and the control pressure passes into the control input 73 to switch the valve arrangement 37.

The overload protection has only been described so far starting from the parking position according to FIGS. 6 and 10. There is also overload protection starting from automatic braking (FIGS. 5 and 9). I.e. if the service brake is actuated after automatic braking, control pressure passes to the first control input 36. The second control input 38 can remain unpressurized in this case. The valve arrangement 37 switches into the position shown in FIGS. 7 and 11 with pressurization of the spring-loaded brake cylinders 44, 45.

A further feature is shown in FIG. 12. Operation starts from automatic braking (FIGS. 5 and 9). The second control input 38 is unpressurized owing to disconnection of the supply pressure line 22. The trailer vehicle is decelerated strongly by the spring-loaded brake cylinders 44, 45. The wheels can lock up. The normally present anti-lock control for the service brake is not active. In order to enable anti-lock control via the trailer brake module 21, the redundancy valve 33 switches from the position of FIGS. 4-11 to the position according to FIG. 12. As a result, the control pressure no longer passes via the redundancy valve 33 to the first control input 36, but reservoir container pressure passes via the line 30 from the reservoir container 24. Accordingly, the valve arrangement 37 switches to the position according to FIG. 12, so that the reservoir container pressure also passes to the second port 40 and the spring-loaded brake cylinders 44, 45 can be pressurized. The trailer vehicle can now be braked via the dedicated service brakes (service brake cylinders 31, 32) with reservoir container pressure from the reservoir container 24. In this case, the anti-lock control that is normally present in the trailer brake module 21 is active.

An electronic brake system is associated with the pneumatic brake system. A brake control unit is a component of the electronic brake system that is not shown here and that is integrated within the trailer brake module 21 or that can be present as an addition. The brake control unit obtains state information in a known way via sensors on the pneumatic brake system and controls the functions of the trailer brake module 21. For example, the control pressure and the supply pressure are monitored, typically also the position of the valve arrangement 37 here. In the event of a sudden loss of the pressure in the supply pressure line 22 and adequate pressure in the reservoir container 24, the brake control unit can switch the redundancy valve 33 to the position according to FIG. 12 and at the same time cause emergency braking with anti-lock protection via the trailer brake module 21 with control of the valves 27, 28. Only if the reservoir container 24 no longer has sufficient pressure is the redundancy valve 33 not actuated to change over, so that automatic braking is carried out by the spring-loaded brake cylinders 44, 45.

A longitudinal deceleration sensor 76 is connected to the brake control unit in the trailer brake module 21 via a line 75. The signals thereof are processed in the brake control unit. The redundancy valve 33 generally only switches into the position according to FIG. 12 if the longitudinal deceleration exceeds a limit value. The longitudinal deceleration sensor 76 can also be integrated within the brake control unit or within the trailer brake module 21.

Figure 13:
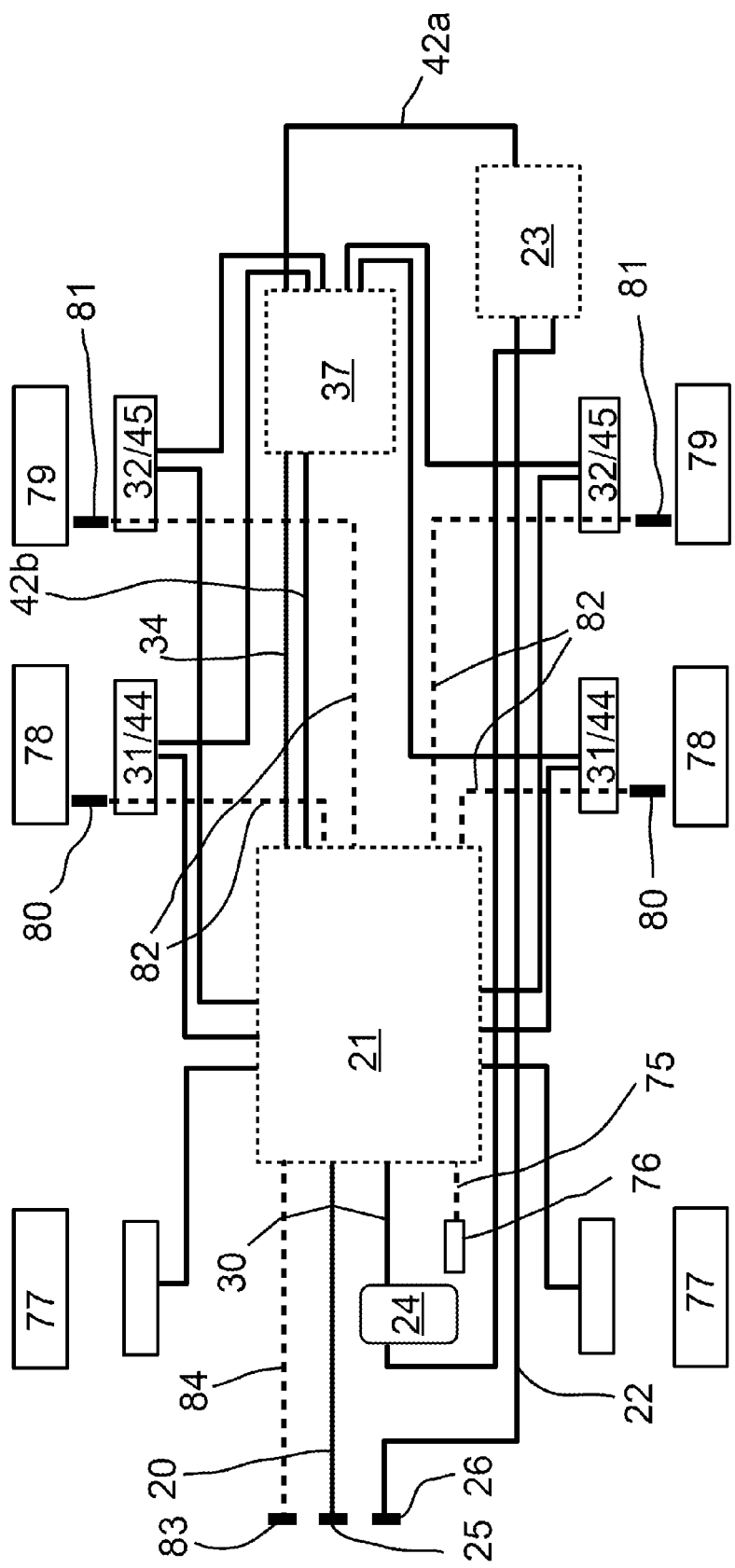

In FIG. 13, the details of the trailer brake module 21, the valve arrangement 37 and the parking release valve 23 that can be seen in the other figures are not shown. Instead, other details of the pneumatic brake system of the trailer vehicle can be seen:

Three axles that are not shown in detail each carry two wheels 77, 78, 79. Revolution rate sensors 80, 81 are associated with each of the wheels 78, 79 of the two rear axles. The signals thereof are delivered via signal lines 82 to the trailer brake module 21 and are processed in the control unit that is integrated therein.

The trailer vehicle and the towing vehicle are connected together via an electric line. For this purpose, an electrical interface 83 is provided in parallel with the coupling heads 25, 26. An electric line 84 leads from the electrical interface 83 to the trailer brake module 21. Integrated within the electric line 84 is an electric brake line according to ISO-11992, with which a braking demand of the driver is transmitted from the towing vehicle to the trailer vehicle.

The control unit in the trailer brake module 21 determines, based on the signals transmitted via the electric brake line on the one hand and the signals of the revolution rate sensors 80, 81 on the one hand, whether there is a braking demand and/or at least one wheel is locked while the trailer vehicle is traveling. If there is no braking demand and at least one wheel is locked while traveling, the control unit controls the pneumatic brake system so that the spring-loaded brake cylinders 44, 45 are pressurized and the service brakes are automatically activated with anti-lock control to carry out full braking. As the control unit performs the braking and the driver is not involved, the braking can also be carried out according to a program that is stored in the control unit with lower braking force than is applied during full braking.

What is claimed is:

1. A method for controlling brakes in a trailer vehicle, wherein the trailer vehicle comprises a pneumatic brake system, service brakes and an electronic brake system with anti-lock control, wherein at least one axle of the trailer vehicle is fitted with spring-loaded brakes and revolution rate sensors, wherein the spring-loaded brakes include a pneumatically actuated valve unit, and wherein the pneumatic brake system further comprises a reservoir container with a reservoir container pressure, said method comprising the steps of:
monitoring with the electronic brake system whether there is a braking demand,
monitoring with the electronic brake system whether at least one wheel of at least one axle is locking up,
if there is no braking demand and at least one wheel of the at least one axle is locked while traveling, controlling the pneumatic braking system with the electronic brake system to pressurize the spring-loaded brakes and to brake the trailer vehicle by the service brakes automatically and with anti-lock control, and
pressurizing the pneumatically actuated valve unit if a control pressure above a limit value is applied to a control input of the pneumatically actuated valve unit, the reservoir container pressure being delivered to the control input of the pneumatically actuated valve unit for triggering the pressurization of the spring-loaded brakes, wherein the control input of the pneumatically actuated valve unit is alternatively coupled to the reservoir container or a control pressure line depending on a position of a solenoid valve.

2. The method as claimed in claim 1, wherein the braking demand exists if a pressure above a limit value is measured in a pneumatic control pressure line in the trailer vehicle or in a towing vehicle of the trailer vehicle or if a signal for actuation of the service brakes is transmitted on an electric brake line.

3. The method as claimed in claim 1, further comprising decelerating the trailer vehicle to a standstill by controlling the pneumatic braking system.

4. The method as claimed in claim 1 further comprising the step of monitoring a longitudinal deceleration of the trailer vehicle and automatically braking the trailer vehicle and pressurizing the spring-loaded brakes only if the longitudinal deceleration exceeds a limit value.

5. A valve arrangement for a pneumatic brake system of a trailer vehicle including service brakes and spring-loaded brakes, wherein the pneumatic brake system comprises a reservoir container with a reservoir container pressure, said valve arrangement comprising:
a pneumatically actuated valve unit for pressurizing the spring-loaded brakes with the reservoir container pressure if a pressure above a limit value is applied to a control input of the pneumatically actuated valve unit, and
a solenoid valve, the solenoid valve being connected to a control pressure of the pneumatic brake system and to the reservoir container pressure, wherein the solenoid valve is switchable between the control pressure of the pneumatic brake system and the reservoir container pressure, and wherein the solenoid valve is connected to the control input of the pneumatically actuated valve unit, such that the control pressure of the pneumatic brake system and the reservoir container pressure are alternatively applied to the control input of the pneumatically actuated valve unit depending on a position of the solenoid valve.

6. A trailer vehicle with a pneumatic brake system, an electronic brake system and a valve arrangement, the valve arrangement being the valve arrangement as claimed in claim 5.

7. An electronic control unit for carrying out the method as claimed in claim 1.

8. An electronic control unit for controlling the valve arrangement as claimed in claim 5.

9. An electronic control unit for a trailer vehicle as claimed in claim 6.

* * * * *